(12) United States Patent
Huang et al.

(10) Patent No.: US 11,727,592 B2
(45) Date of Patent: Aug. 15, 2023

(54) DETECTION APPARATUS AND METHOD AND IMAGE PROCESSING APPARATUS AND SYSTEM, AND STORAGE MEDIUM

(71) Applicant: CANON KABUSHIKI KAISHA, Tokyo (JP)

(72) Inventors: Yaohai Huang, Beijing (CN); Yan Zhang, Beijing (CN); Zhiyuan Zhang, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 48 days.

(21) Appl. No.: 16/693,141

(22) Filed: Nov. 22, 2019

(65) Prior Publication Data
US 2020/0167587 A1 May 28, 2020

(30) Foreign Application Priority Data
Nov. 28, 2018 (CN) .......................... 201811432004.1

(51) Int. Cl.
| | | |
|---|---|---|
| *G06T 7/73* | (2017.01) | |
| *G06F 18/21* | (2023.01) | |
| *G06V 10/46* | (2022.01) | |
| *G06V 10/764* | (2022.01) | |
| *G06V 10/82* | (2022.01) | |

(Continued)

(52) U.S. Cl.
CPC ............ *G06T 7/73* (2017.01); *G06F 18/2163* (2023.01); *G06V 10/464* (2022.01); *G06V 10/50* (2022.01); *G06V 10/764* (2022.01); *G06V 10/82* (2022.01); *G06V 40/103* (2022.01); *G06T 2207/20016* (2013.01); *G06T 2207/20084* (2013.01);

(Continued)

(58) Field of Classification Search
CPC ...... G06K 9/3241; G06K 9/46; G06K 9/6261; G06K 9/00369; G06K 9/6271; G06K 2009/6213; G06K 9/4642; G06K 9/4676; G06T 7/73; G06T 2207/30196; G06T 2207/30242; G06T 2207/20016; G06T 2207/20084; G06T 2207/20021; G06T 7/12; G06T 7/187; G06T 7/194
See application file for complete search history.

(56) References Cited

U.S. PATENT DOCUMENTS

| | | |
|---|---|---|
| 9,514,389 B1 | 12/2016 | Erhan |
| 2013/0329964 A1 | 12/2013 | Nishi |

(Continued)

FOREIGN PATENT DOCUMENTS

| | | |
|---|---|---|
| CN | 108875750 A | 11/2018 |
| WO | 2014/103433 A1 | 7/2014 |

OTHER PUBLICATIONS

Tang Xiao-pei et al., Research on Candidate Area Selection of Aircraft Targets in Remote Sensing Images, China Academic Journal Electronic Publishing House.

*Primary Examiner* — Sean M Conner
*Assistant Examiner* — Han Hoang
(74) *Attorney, Agent, or Firm* — Canon U.S.A., Inc. IP Division

(57) ABSTRACT

A detection apparatus to extract features from an image; determine the number of candidate regions of the object in the image based on the extracted features, wherein the determined number of the candidate regions is decided by a position and shape of the candidate regions; and to detect the object from the image based on at least the extracted features and the determined number, position and shape of the candidate regions.

21 Claims, 11 Drawing Sheets

(51) Int. Cl.
  *G06V 10/50* (2022.01)
  *G06V 40/10* (2022.01)
  *G06V 10/75* (2022.01)

(52) U.S. Cl.
  CPC .............. *G06T 2207/30196* (2013.01); *G06T 2207/30242* (2013.01); *G06V 10/759* (2022.01)

(56) References Cited

U.S. PATENT DOCUMENTS

| | | | |
|---|---|---|---|
| 2014/0028442 A1* | 1/2014 | Yu | H04L 67/12 |
| | | | 340/10.1 |
| 2017/0206431 A1 | 7/2017 | Sun et al. | |
| 2018/0089505 A1* | 3/2018 | El-Khamy | G06T 7/73 |
| 2019/0072977 A1* | 3/2019 | Jeon | G06K 9/3241 |
| 2020/0074690 A1* | 3/2020 | Fukagai | G06K 9/00973 |
| 2021/0357708 A1* | 11/2021 | Sakai | G06V 40/166 |
| 2022/0101635 A1* | 3/2022 | Koivisto | G05D 1/00 |

\* cited by examiner

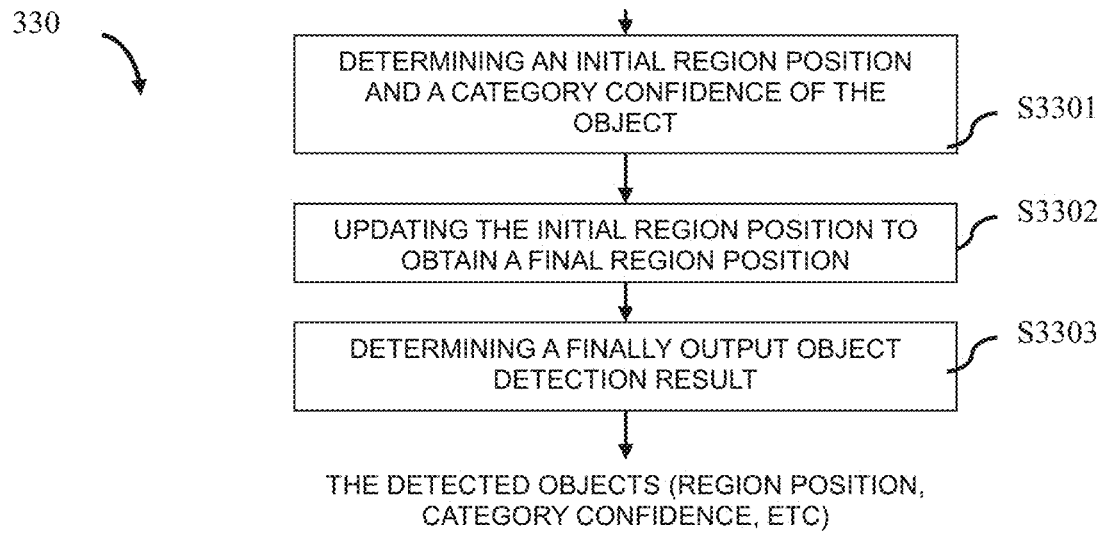
FIG.14
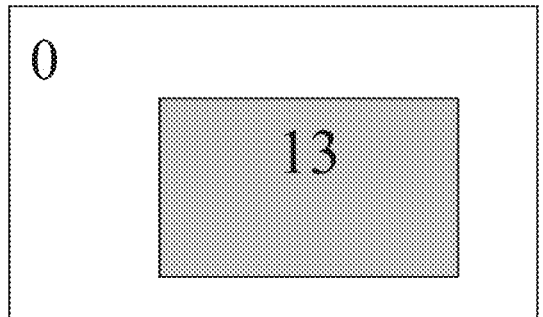
FIG.15A  FIG.15B
FIG.15C

| 6 | 9 |
|---|---|
| 3 | 6 |
FIG.16
FIG.17A
FIG.17B

DETECTION APPARATUS AND METHOD AND IMAGE PROCESSING APPARATUS AND SYSTEM, AND STORAGE MEDIUM

CROSS-REFERENCE TO RELATED APPLICATION

This application claims the benefit under 35 U.S.C. § 119(a)-(d) of Chinese Patent Application No. 201811432004.1, filed on Nov. 28, 2018. The above cited patent application is incorporated herein by reference in its entirety.

BACKGROUND OF THE INVENTION

Field of the Invention

The present disclosure relates to image processing, particularly to detection of objects in an image, for example.

Description of the Related Art

In image processing, it is a critical task to accurately detect an object (e.g., human body) from videos/images. For example, the detected human body usually can be used in the image processing such as human image retrieval, human attribute recognition, human action recognition, human identification verification and so on.

Recently, a neural network has made progress in object detection, e.g. the U.S. Pat. No. 9,514,389B1 discloses an exemplary technique. The exemplary technique mainly includes: executing corresponding processing (e.g., linear transformation processing) on the features extracted from the image to obtain a predetermined number of candidate regions; and executing corresponding processing (e.g., regression processing) on the extracted features using the predetermined number of candidate regions to detect the object from the image, wherein the obtained output includes, for example, a confidence score that an object is contained in each candidate region. Wherein, the predetermined number is decided by the number of candidate regions allocated at each predetermined position in the image, and the number of candidate regions allocated at each predetermined position is the same. Wherein, in this exemplary technique, each of the above processing is implemented by an object detection neural network.

As can be seen from the above exemplary technique, the predetermined number of candidate regions are mainly used to perform the corresponding regression processing, to implement the detection of the object in the image, and the predetermined number is decided by the number of candidate regions allocated at each predetermined position in the image. Thus, according to the above exemplary technique, the number of candidate regions allocated at each predetermined position will directly affect a detection speed and a detection accuracy of the object detection. Wherein, the number of candidate regions allocated at each predetermined position is the same, as stated above. However, distribution of the objects is usually uneven in the image. If each predetermined position in the image is allocated with the same number (a large number) of candidate regions, that is to say, a large number of candidate regions will also be allocated to the background portion in the image (it is in fact unnecessary to allocate so many candidate regions to this type of portion), the detection speed of the object detection would be affected (e.g. the detection time would be increased) when the regression processing is performed using so many candidate regions. On the other hand, if each predetermined position in the image is allocated with the same number (a small number) of candidate regions, that is to say, a small number of candidate regions will also be allocated to the foreground portion in the image, particularly to a portion where the objects are distributed densely (it is in fact needed to allocate a larger number of candidate regions to this type of portion), it is unable to detect objects from the image as many as possible when the regression processing is performed using so few candidate regions, thereby affecting the detection accuracy of the object detection.

SUMMARY OF THE INVENTION

In view of the recordation in the above Related Art, the present disclosure is directed to solve at least one of the above issues.

According to an aspect of the present disclosure, there is provided a detection apparatus comprising: an extraction unit configured to extract features from an image; a determination unit configured to determine the number of candidate regions of an object in the image based on the extracted features, wherein the determined number of the candidate regions is decided by a position and shape of the candidate regions; and a detection unit configured to detect the object from the image based on at least the extracted features and the determined number, position and shape of the candidate regions. Wherein more candidate regions are to be allocated to a portion where the distribution is denser in feature distribution of the object in the image; wherein the feature distribution is obtained based on the extracted features. Wherein the extraction unit, the determination unit and the detection unit execute the corresponding operation using a pre-generated neural network.

According to another aspect of the present disclosure, there is provided a detecting method comprising: extracting features from an image; determining the number of candidate regions of the object based on the extracted features, wherein the determined number of the candidate regions is decided by a position and shape of the candidate regions; and detecting the object from the image based on at least the extracted features and the determined number, position and shape of the candidate regions. Wherein more candidate regions are to be allocated to a portion where the distribution is denser in feature distribution of the object in the image; wherein the feature distribution is obtained based on the extracted features. Wherein in the detecting method, corresponding operations are executed using a pre-generated neural network.

According to further aspect of the present disclosure, there is provided an image processing apparatus comprising: an acquisition device which acquires an image or video; a storage device which stores an instruction; and a processor which executes the instruction based on the acquired image or video, such that the processor at least implements the detecting method as described above.

According to further aspect of the present disclosure, there is provided an image processing system comprising: an acquisition apparatus which acquires an image or video; the detection apparatus as described above for detecting an object from the acquired image or video; and a processing apparatus which executes subsequent image processing operation based on the detected object, wherein the acquisition apparatus, the detection apparatus and the processing apparatus are connected each other via a network.

Since the present disclosure determines the number of candidate regions of the object by using the extracted features (in particular, feature distribution of the object), according to the present disclosure, the corresponding number of candidate regions can be dynamically allocated at each corresponding position in the image. Therefore, according to the present disclosure, on one hand, more candidate regions are to be allocated to a portion where the distribution is denser (i.e., the portion where distribution of the objects is denser in the image) in the feature distribution, such that the detection accuracy of the object detection can be improved. On the other hand, fewer candidate regions are to be allocated to the portion where distribution of the objects is sparser (i.e., the portion that has a larger probability to belong to the background) in the image, such that the detection speed of the object detection can be improved.

Further features and advantages of the present disclosure will become apparent from the following description of typical embodiments with reference to the attached drawings.

BRIEF DESCRIPTION OF THE DRAWINGS

The accompanying drawings, which are incorporated in and constitute a part of the specification, illustrate embodiments of the present disclosure and, together with the description of the embodiments, serve to explain the principles of the present disclosure.

FIGS. 5A-5B schematically illustrate examples of the feature distribution of the object, wherein FIG. 5A illustrates one example of the feature distribution directly indicated by feature values of the extracted features, and FIG. 5B illustrates one example of the feature distribution indicated by normalized values of the feature values as shown in FIG. 5A.

FIG. 14 schematically illustrates one flow chart of a detecting step S330 as shown in FIG. 3 according to an embodiment of the present disclosure.

FIGS. 15A-15C schematically illustrate one feature distribution directly indicated by feature values of the extracted features, a density distribution and a threshold value distribution of the object corresponding to the feature distribution, respectively.

FIG. 16 schematically illustrates one example of the density distribution of the object.

FIGS. 17A-17B schematically illustrate examples of object detection results according to the present disclosure.

DESCRIPTION OF THE EMBODIMENTS

Figure 1:
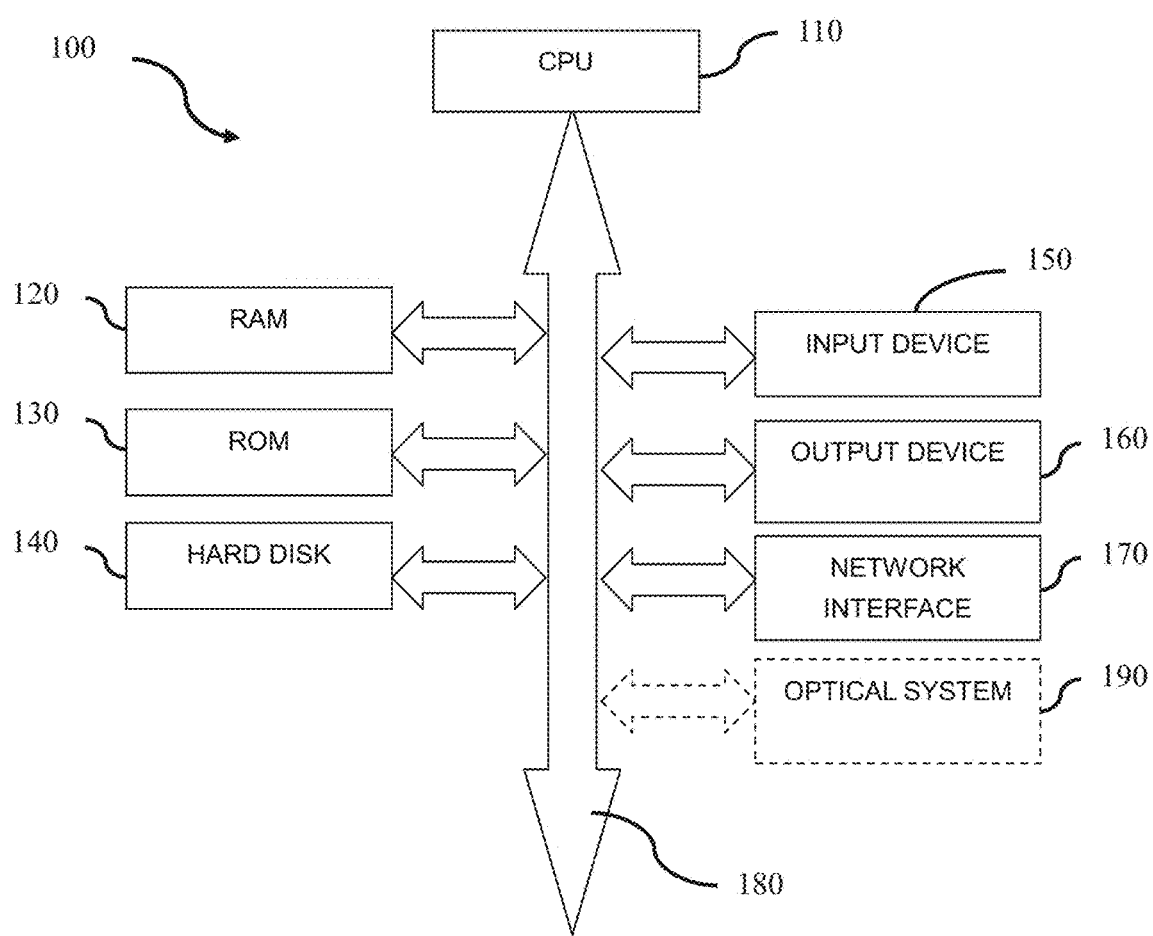
FIG. 1 is a block diagram schematically illustrating a hardware configuration which is capable of implementing a technique according to an embodiment of the present disclosure.

Exemplary embodiments of the present disclosure will be described in detail below with reference to the drawings. It should be noted that the following description is illustrative and exemplary in nature and is in no way intended to limit the disclosure, its application or uses. The relative arrangement of the components and steps, the numerical expressions, and numerical values set forth in these embodiments do not limit the scope of the present disclosure unless it is specifically stated otherwise. In addition, the techniques, methods and devices known by persons skilled in the art may not be discussed in detail, however, they shall be a part of the present specification under a suitable circumstance.

It is noted that, similar reference signs and letters refer to similar items in the drawings, and thus once an item is defined in one figure, it may not be discussed in the following figures.

As stated above, considering that distribution of the objects is usually uneven in the image, the inventors deem that how to take account of this uneven distribution while allocating the candidate regions is critical to improve the detection accuracy or detection speed of the object detection. Considering that the feature values of the features extracted from the image can represent the feature distribution of the object and the feature distribution of the object can embody distribution of the objects in the image, the inventors deem that an appropriate number of candidate regions can be allocated respectively to different portions in the image using the features (in particular, feature distribution of the object) extracted from the image, so as to improve the detection accuracy and/or detection speed of the object detection. For example, in the present disclosure, more candidate regions are to be allocated to a portion where the distribution is denser in the feature distribution, and fewer candidate regions are to be allocated to a portion where the distribution is sparser in the feature distribution. Wherein, how to implement dynamic allocation of the candidate regions using the feature distribution of the object will be described in detail below with reference to the accompanying drawings.

As stated above, according to the present disclosure, on one hand, since more candidate regions are to be allocated to the portion where distribution of the objects is denser (i.e., the portion where the distribution is denser in the feature distribution) in the image, the detection accuracy of the object detection can be improved. On the other hand, since fewer candidate regions are to be allocated to the portion where distribution of the objects is sparser (i.e., the portion where the distribution is sparser in the feature distribution) in the image, the detection speed of the object detection can be improved.

(Hardware Configuration)

At first, the hardware configuration capable of implementing the technique described below will be described with reference to FIG. 1.

The hardware configuration 100 includes for example a central processing unit (CPU) 110, a random access memory (RAM) 120, a read only memory (ROM) 130, a hard disk 140, an input device 150, an output device 160, a network interface 170 and a system bus 180. Further, in one implementation, the hardware configuration 100 can be implemented by a computer such as a tablet computer, a laptop, a desktop or other suitable electronic devices. In another implementation, the hardware configuration 100 can be implemented by a monitor device such as a digital camera, a video camera, a network camera or other suitable electronic devices. Wherein, in a case where the hardware configuration 100 is implemented by the monitor device, the hardware configuration 100 further includes for example an optical system 190.

In one implementation, the detection apparatus according to the present disclosure is configured by hardware or firmware, and serves as modules or components of the hardware configuration 100. For example, the detection apparatus 200 that will be described in detail below with reference to FIG. 2 serves as modules or components of the hardware configuration 100. In another implementation, the detection apparatus according to the present disclosure is configured by software which is stored in the ROM 130 or the hard disk 140 and is executed by the CPU 110. For example, the procedure 300 that will be described in detail below with reference to FIG. 3 serves as a program stored in the ROM 130 or the hard disk 140.

The CPU 110 is any suitable programmable control device (e.g. a processor) and can execute various kinds of functions to be described below by executing various kinds of application programs stored in the ROM 130 or the hard disk 140 (e.g. a memory). The RAM 120 is used to temporarily store programs or data loaded from the ROM 130 or the hard disk 140, and is also used as a space in which the CPU 110 executes various kinds of procedures (e.g. implementing the technique to be described in detail below with reference to FIGS. 3 to 16 and 19) and other available functions. The hard disk 140 stores many kinds of information such as operating systems (OS), various kinds of applications, control programs, videos, images, pre-generated networks (e.g. neural networks), predefined data (e.g. threshold values (THs)) or the like.

In one implementation, the input device 150 is used to enable a user to interact with the hardware configuration 100. In one example, the user can input images/videos/data via the input device 150. In another example, the user can trigger the corresponding processing of the present disclosure via the input device 150. Further, the input device 150 can adopt a plurality of kinds of forms, such as a button, a keyboard or a touch screen. In another implementation, the input device 150 is used to receive images/videos output from a specialized electronic device such as a digital camera, a video camera and/or a network camera. In addition, in a case where the hardware configuration 100 is implemented by the monitor device, the optical system 190 in the hardware configuration 100 will directly capture images/videos at the monitored position.

In one implementation, the output device 160 is used to display processing results (e.g. the detected object) to the user. Moreover, the output device 160 can adopt various kinds of forms such as a cathode ray tube (CRT), liquid crystal display or the like. In another implementation, the output device 160 is used to output processing results to the subsequent image processing such as human image retrieval, human attribute recognition, human action recognition, human identification verification and so on.

The network interface 170 provides an interface for connecting the hardware configuration 100 to a network. For example, the hardware configuration 100 can perform a data communication with other electronic devices that are connected by a network via the network interface 170. Alternatively, the hardware configuration 100 may be provided with a wireless interface to perform a wireless data communication. The system bus 180 can provide a data transmission path for mutually transmitting data among the CPU 110, the RAM 120, the ROM 130, the hard disk 140, the input device 150, the output device 160, the network interface 170, and the optical system 190, etc. Although being called as a bus, the system bus 180 is not limited to any specific data transmission technique.

The above hardware configuration 100 is only illustrative and is in no way intended to limit the present disclosure, its application or uses. Moreover, for the sake of simplification, only one hardware configuration is illustrated in FIG. 1. However, a plurality of hardware configurations may also be used as required.

(Detection Apparatus and Method)

Next, the object detection according to the present disclosure will be described with reference to FIGS. 2 to 17B.

Figure 2:
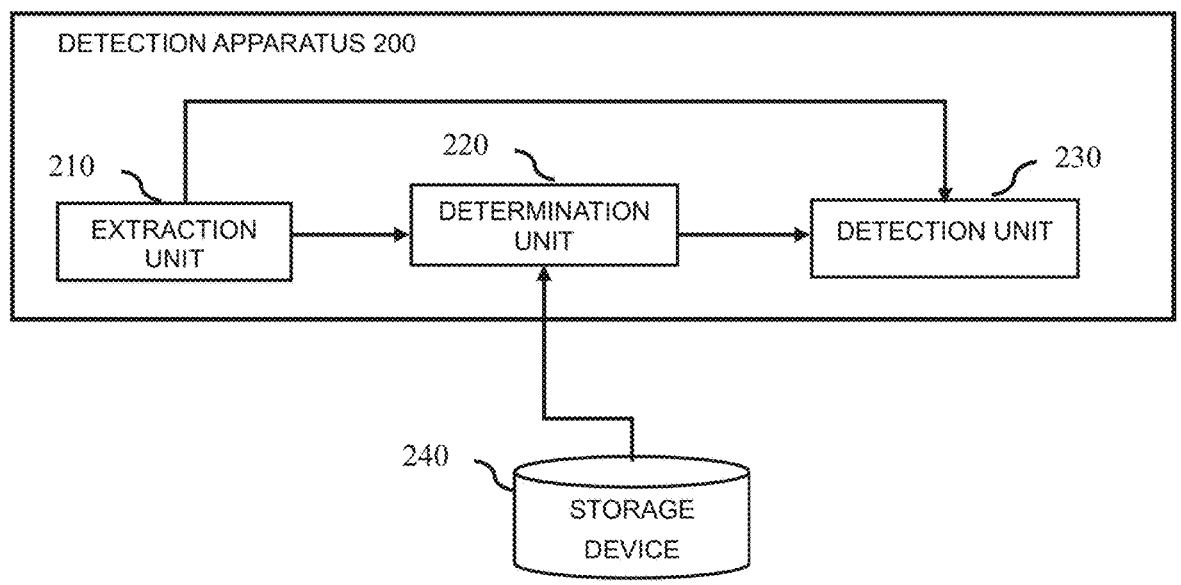
FIG. 2 is a block diagram illustrating a configuration of a detection apparatus according to an embodiment of the present disclosure.

FIG. 2 is a block diagram illustrating a configuration of the detection apparatus 200 according to an embodiment of the present disclosure. Wherein, a part of or all of modules shown in FIG. 2 can be implemented by specialized hardware. As shown in FIG. 2, the detection apparatus 200 includes an extraction unit 210, a determination unit 220 and a detection unit 230. Wherein, the detection apparatus 200 can be, for example, used to detect an object (e.g., a human body) from the video/image.

In addition, the storage device 240 shown in FIG. 2 at least stores for example the preset candidate regions having different shapes and scales. In one implementation, the storage device 240 is the ROM 130 or the hard disk 140 shown in FIG. 1. In another implementation, the storage device 240 is a server or an external storage device connected to the detection apparatus 200 via a network (not shown).

At first, in one implementation, in a case where the hardware configuration 100 shown in FIG. 1 is implemented by the computer for example, the input device 150 receives an image output from the specialized electronic device (e.g. a video camera or the like) or input by the user, wherein the image can also be one video frame in the video output from the specialized electronic device or input by the user. Next, the input device 150 transfers the received image to the detection apparatus 200 via the system bus 180. In another implementation, in a case where the hardware configuration 100 is implemented by the monitor device for example, the detection apparatus 200 directly uses the image captured by the optical system 190.

Then, as shown in FIG. 2, the extraction unit 210 extracts features from the received image, wherein the extracted features are for example features of the whole image. That is to say, in a case where the object is included in the image, the extracted features likewise include features of the object. In one implementation, the extraction unit 210 can extract features from the image using the existing feature extracting algorithm, such as a Local Binary Pattern (LBP) algorithm, a Fast Fourier Transform (FFT) algorithm, a Gabor algorithm, etc. In another implementation, the extraction unit 210 can extract features from the image using the pre-generated neural network stored for example in the storage device 240. Wherein, hereinafter, a method of pre-generating the neural network will be described in detail with reference to FIGS. 18 to 19.

The determination unit 220 determines the number of candidate regions of the object in the image based on the features extracted by the extraction unit 210. Wherein, on one hand, the determination unit 220 obtains the feature distribution of the objects in the image based on the extracted features. Specifically, the feature distribution of the objects for example can be directly indicated by the feature values of the extracted features or for example can be indicated by normalized values of feature values of the extracted features. On the other hand, the determination unit 220 determines the number of candidate regions of the object based on the obtained feature distribution, wherein the candidate regions can be viewed for example as anchors. Wherein, in order to reasonably utilize a small number of candidate regions to improve the accuracy or speed of the object detection, in the present disclosure, more candidate regions are to be allocated to the portion where the distribution is denser in the feature distribution. For example, more candidate regions are allocated to the portion where the feature value/normalized value in the feature distribution is bigger; fewer candidate regions are allocated to the portion where the feature value/normalized value in the feature distribution is smaller.

In the present disclosure, the number of candidate regions determined by the determination unit 220 is decided by the position and shape of the candidate regions. Wherein, the shape of the candidate regions can be for example a triangle, quadrangle, polygon, roundness, ellipse, etc. However, apparently, the present disclosure is not limited to this, given that various shapes which can be obtained can be used as shapes of the candidate regions. In one implementation, in order to improve the accuracy of the object detection, the candidate regions of the corresponding shape and scale can be determined according to the shape and scale of the object in the image for the object detection. Specifically, for example, as stated above, the storage device 240 stores the preset candidate regions having different shapes and scales, such that the suitable candidate regions can be selected from the storage device 240 according to the shape and scale of the object in the image for the object detection.

Returning to FIG. 2, the detection unit 230 detects the object from the image based on at least the features extracted by the extraction unit 210 and the number, position and shape of the candidate regions determined by the determination unit 220, e.g. detects the position of the region where the object is located, the category confidence of the object, etc.

Wherein, the determination unit 220 and the detection unit 230 can execute the corresponding operation based on different portions in the features extracted by the extraction unit 210. For example, the determination unit 220 mainly executes the corresponding operation based on those features, among the extracted features, capable of embodying distribution of the object in the image. For example, the detection unit 230 mainly executes the corresponding operation based on those features, among the extracted features, capable of embodying semantic information of the object in the image. Further, alternatively, the features used by the determination unit 220 and the detection unit 230 can also be extracted by different extraction units.

Further, as stated above, the extraction unit 210 can execute the corresponding operation using the pre-generated neural network stored for example in the storage device 240. Likewise, in order to improve the accuracy of the object detection, the determination unit 220 and the detection unit 230 can also execute the corresponding operation using the pre-generated neural network stored for example in the storage device 240. Wherein, hereinafter, the method of pre-generating the neural network will be described in detail with reference to FIGS. 18 to 19.

At last, the detection unit 230 transfers the detected result (e.g. the detected object) to the output device 160 via the system bus 180 shown in FIG. 1, so as to display the detected object to the user or output detection results to the subsequent image processing such as human image retrieval, human attribute recognition, human action recognition, human identification verification and so on.

Figure 3:
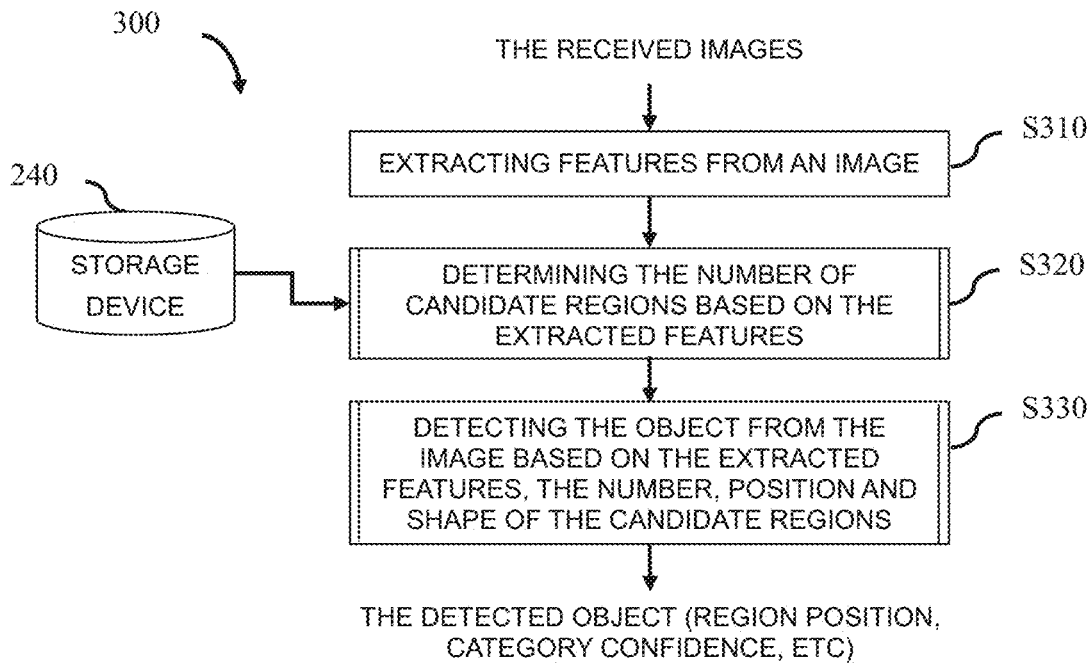
FIG. 3 schematically illustrates a flow chart of a detecting method according to an embodiment of the present disclosure.

The flow chart 300 shown in FIG. 3 is a corresponding procedure of the detection apparatus 200 shown in FIG. 2.

As shown in FIG. 3, in an extracting step S310, the extraction unit 210 extracts features from the received image.

In a determining step S320, the determination unit 220 determines the number of candidate regions of the object in the image based on the extracted features. Specifically, the determination unit 220 obtains the feature distribution of the object in the image based on the extracted features and determines the number of candidate regions of the object based on the obtained feature distribution, wherein the determined number of the candidate regions is decided by the position and shape of the candidate regions. Wherein, as stated above, in the present disclosure, more candidate regions are to be allocated to the portion where the distribution is denser in the feature distribution. In another implementation, the determination unit 220 determines the number of candidate regions with reference to FIG. 4.

Figure 4:
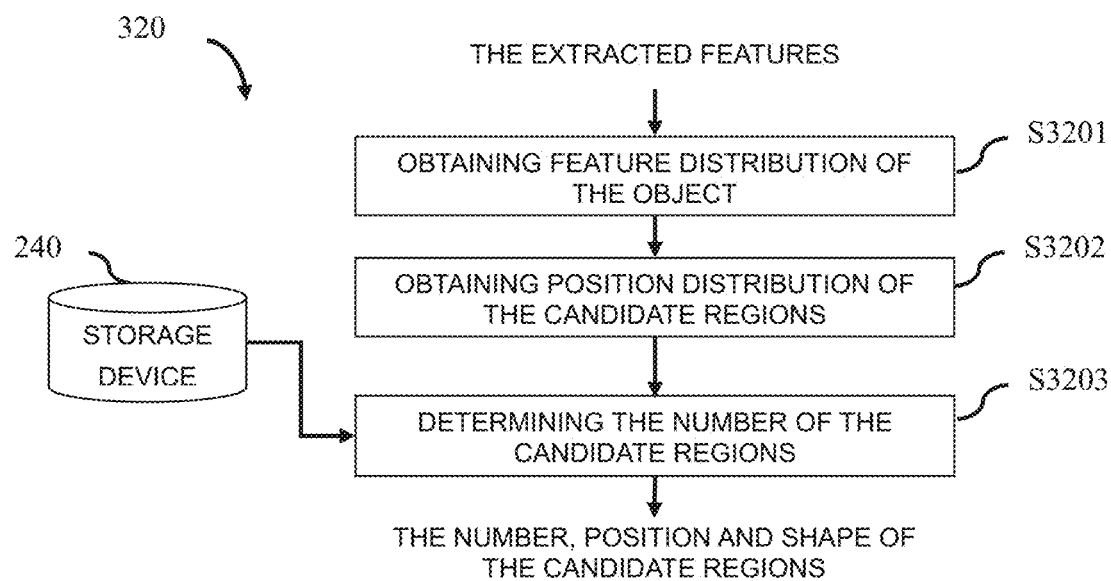
FIG. 4 schematically illustrates one flow chart of a determining step S320 as shown in FIG. 3 according to an embodiment of the present disclosure.
Figure 5A:
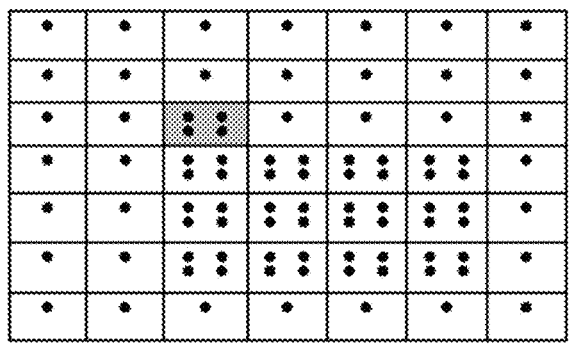
Figure 5B:
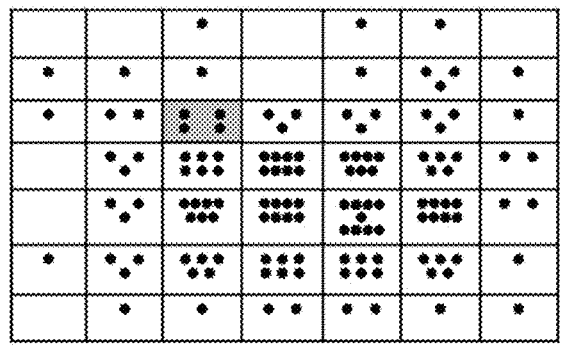

As shown in FIG. 4, in step S3201, the determination unit 220 obtains the feature distribution of the object based on the extracted features. As stated above, in one implementation, the feature distribution of the object can be directly indicated for example by the feature values of the extracted features (such as one feature distribution as shown in FIG. 5A). In another implementation, the feature distribution of the object can be indicated for example by the normalized values of the feature values of the extracted features (such as one feature distribution as shown in FIG. 5B), wherein the corresponding normalization operation can be performed for example based on the maximum feature value.

In step S3202, the determination unit 220 obtains the position distribution of the candidate regions based on the obtained feature distribution. In one implementation, in order to improve the speed of the object detection, the determination unit 220 obtains the position distribution of the candidate regions by comparing the feature value or the normalized value in the obtained feature distribution with the predefined threshold value, wherein the number of the predefined threshold value can be dynamically determined according to the practical application. For example, the corresponding operation can be implemented by the following exemplary function (1):

$$F_P(s) = \begin{cases} M & 0 \leq s < TH1 \\ N & TH1 \leq s \leq TH2 \end{cases} \quad (1)$$

Wherein, $F_P(s)$ indicates the position distribution of the candidate regions, s indicates the feature value or the normalized value in the obtained feature distribution, TH2 is for example the maximum feature value or the maximum normalized value, TH1 is a value between (0, TH2), M and N indicate the number of the positions, and M<N. Wherein, the above function (1) indicates that: as one feature value or normalized value is a value for example between [0, TH1), there may be M positions that can be allocated with the candidate regions in the corresponding portion in the feature distribution; as one feature value or normalized value is a value for example between [TH1~TH2], there may be N positions that can be allocated with the candidate regions in the corresponding portion in the feature distribution. Therefore, the position distribution of the whole candidate region can be obtained after each feature value or normalized value is compared with the predefined threshold value. In the above function (1), the position distribution can be obtained by predefining two threshold values in comparison. However, apparently, the present disclosure is not limited to this. According to the practical application, more threshold values can be predefined in comparison, thereby obtaining the more refined position distribution. Taking the feature distribution shown in FIG. 5B as an example, s indicates the normalized value, and assuming that the above function (1) is exemplarily set as the following function (2):

$$F_P(s) = \begin{cases} 1 & 0 \leq s < 0.5 \\ 4 & 0.5 \leq s \leq 1.0 \end{cases} \quad (2)$$

Figure 6A:
FIGS. 6A-6B schematically illustrate examples of the position distribution of the candidate regions determined using the feature distribution as shown in FIG. 5B according to the present disclosure.

Therefore, for the normalized value "0.54" in the feature distribution for example (as shown by the gray portion in FIG. 5B), there may be 4 positions that can be allocated with the candidate regions in the corresponding portion (as shown by the gray portion in FIG. 6A). Wherein, FIG. 6A exemplarily illustrates the obtained position distribution of the whole candidate region, in which one dark spot shown in FIG. 6A indicates one position at which the candidate regions can be allocated, and there are 88 positions that can be used to allocate the candidate regions in total.

According to the above implementation, it can be known that the finally obtained position distribution of the candidate regions is discrete. In order to embody the density distribution of the object in the image more truly and improve the recall rate of the object detection, it can be implemented by obtaining continuous position distribution of the candidate regions. Therefore, in another implementation, the determination unit 220 obtains the position distribution of the candidate regions based on the feature value or the normalized value in the obtained feature distribution and the maximum value of the number of positions which are available for allocating the candidate regions and which can be present at the portion corresponding to each feature value or normalized value. For example, the corresponding operation can be implemented by the following exemplary function (3):

$$F_P(s) = MaxNumber * s \quad (3)$$

Wherein, $F_P(s)$ indicates the position distribution of the candidate regions, s indicates the feature value or the normalized value in the obtained feature distribution, and MaxNumber indicates the maximum value of the number of positions which are available for allocating the candidate regions and which can be present at the portion corresponding to each feature value or normalized value, wherein the maximum value is the predefined numerical value. Wherein, the maximum value of the number of positions which are available for allocating the candidate regions and which can be present at the portion corresponding to each feature value or normalized value may be the same or may be different. For example, since the objects are usually densely distributed in the middle of the image rather than the periphery of the image, the density distribution of the object in the middle of the image is denser than the density distribution in the periphery of the image. Thus, different MaxNumbers can be respectively predefined for the portion located in the middle of the image and the portion located in the periphery of the image, for example, the MaxNumber predefined for the portion in the middle of the image is larger than the MaxNumber predefined for the portion in the periphery of the image. Wherein, the above function (3) indicates that: the number of positions which are available for allocating the candidate regions and which can be present at the corresponding portion in the feature distribution can be determined by a product of one feature value or normalized value and the predefined MaxNumber, wherein the number of the positions can be obtained by for example rounding off or directly rounding the obtained product values. Thus, the position distribution of the whole candidate region can be obtained after each feature value or normalized value is multiplied by the MaxNumber. In the above function (3), the position distribution is obtained by the product algorithm. However, apparently, the present disclosure is not limited to this, and the position distribution can also be obtained by other math algorithms (e.g. an index algorithm). Likewise, taking the feature distribution shown in FIG. 5B as an example, s indicates the normalized value, and assuming that the above function (3) is exemplarily set as the following function (4), wherein it is assumed that the value is acquired by the operation of directly rounding:

$$F_P(s) = 9 * s \quad (4)$$

Figure 6B:
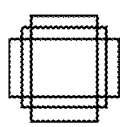

Therefore, for example, for the normalized value "0.54" in the feature distribution (as shown by the gray portion in FIG. 5B), there may be 4 positions that can be allocated with the candidate regions in the corresponding portion (as shown by the gray portion in FIG. 6B). Wherein, FIG. 6B exemplarily illustrates the obtained position distribution of the whole candidate region, in which one dark spot shown in FIG. 6B indicates one position at which the candidate regions can be allocated, and there are 131 positions that can be used to allocate the candidate regions in total.

Figure 7:
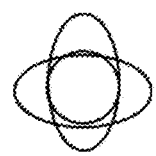
FIG. 7 schematically illustrates examples of nine candidate regions which can be allocated at each position in the position distribution of the candidate regions as shown in FIGS. 6A-6B.

Returning to FIG. 4, in step S3203, the determination unit 220 determines the number of candidate regions based on the obtained position distribution of the candidate regions. In one implementation, firstly, the determination unit 220 sets the number of the allocable candidate regions at each position in the position distribution of the candidate regions, wherein the number set at each position is the same (e.g. every position is set to be nine). Secondly, the determination unit 220 selects a suitable candidate region at each position according to the set number, such that the number of the whole candidate region can be determined for the object detection. As stated above, the suitable candidate regions can be selected from the storage device 240 according to the shape and scale of the object in the image. Wherein, the candidate regions allocated at each position may have different shapes and different scales, given that the number of the allocated candidate regions is the same. Taking the position distribution of the candidate regions shown in FIGS. 6A-6B as an example, assuming that nine candidate regions can be allocated at each position, and assuming that the nine candidate regions allocated at each position are composed of the quadrangle having different scales and the ellipse having different scales (as shown in FIG. 7), the number of candidate regions determined according to the position distribution of the candidate regions as shown in FIG. 6A is "88*9=792", and the number of candidate regions determined according to the position distribution of the candidate regions as shown in FIG. 6B is "131*9=1179".

Returning to FIG. 3, for the determining step S320, in addition to determining the number of candidate regions according to the position distribution of the candidate regions with reference to FIG. 4, the number of candidate regions can also be determined according to the shape distribution of the candidate regions. Therefore, in another implementation, the determination unit 220 determines the number of the candidate regions with reference to FIG. 8.

Figures 8, 9:
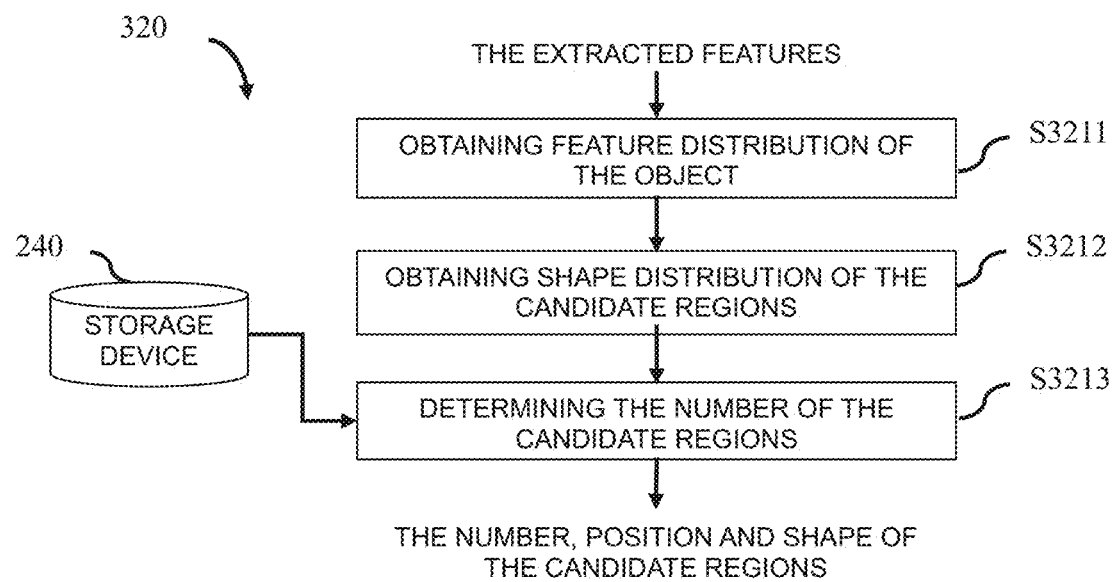
FIG. 8 schematically illustrates another flow chart of a determining step S320 as shown in FIG. 3 according to an embodiment of the present disclosure.
FIG. 9 schematically illustrates an example of the shape distribution of the candidate regions determined using the feature distribution as shown in FIG. 5B according to the present disclosure.
Figure 10A:
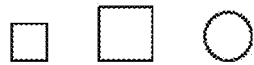
FIGS. 10A-10C schematically illustrate examples in which there are three candidate regions, six candidate regions and nine candidate regions respectively in the shape distribution of the candidate regions as shown in FIG. 9.
Figure 10B:
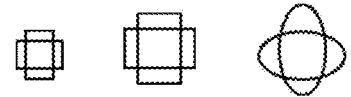
Figure 10C:
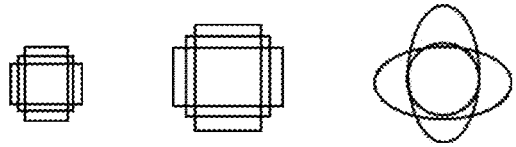

As shown in FIG. 8, since the operation of step S3211 is the same as the operation of step S3201 shown in FIG. 4, no detailed descriptions will be given.

In step S3212, the determination unit 220 obtains the shape distribution of candidate regions based on the obtained feature distribution, wherein the obtained shape distribution of the candidate regions is composed of the number of the candidate regions which can be present at the position corresponding to each of the feature values or normalized values in the obtained feature distribution. Wherein, for the number of candidate regions which can be present at each position, in one implementation, in order to improve the recall rate of the object detection, the determination unit 220 obtains the number of the corresponding candidate regions by comparing the corresponding feature value or normalized value with the predefined threshold value, wherein the number of the predefined threshold value can be dynamically determined according to the practical application. For example, the corresponding operation can be implemented by the following exemplary function (5):

$$F_P(s) = \begin{cases} T1 & (0 \leq s < TH3) \\ T2 & (TH3 \leq s \leq TH4) \\ T3 & (TH4 < s \leq TH5) \end{cases} \quad (5)$$

Wherein, $F_s(s)$ indicates the shape distribution of the candidate regions, s indicates the feature value or the normalized value in the obtained feature distribution, TH5 is for example the maximum feature value or the maximum normalized value, TH3 and TH4 are values between (0, TH5), T1, T2 and T3 indicate the number of candidate regions, and T1<T2<T3. Wherein, the above function (5) indicates that: as one feature value or normalized value is a value for example between [0, TH3), there may be T1 candidate regions in the corresponding portion in the feature distribution; as one feature value or normalized value is a value for example between [TH3~TH4], there may be T2 candidate regions in the corresponding portion in the feature distribution; as one feature value or normalized value is a value for example between (TH4~TH5], there may be T3 candidate regions in the corresponding portion in the feature distribution. In the above function (5), the shape distribution can be obtained by predefining three threshold values in comparison. However, apparently, the present disclosure is not limited to this. According to the practical application, more threshold values can be predefined in comparison, thereby obtaining the more refined shape distribution. Thus, the shape distribution of the whole candidate region can be obtained after the number of candidate regions which can be present at each position is determined in accordance with the above manner. Likewise, taking the feature distribution shown in FIG. 5B as an example, s indicates the normalized value, and assuming that the above function (5) is exemplarily set as the following function (6):

$$F_P(s) = \begin{cases} 3 & (0 \leq s < 0.34) \\ 6 & (0.34 \leq s \leq 0.67) \\ 9 & (0.67 < s \leq 1.0) \end{cases} \quad (6)$$

Therefore, for the normalized value "0.54" in the feature distribution for example (as shown by the gray portion in FIG. 5B), there may be 6 candidate regions at the corresponding position (as shown by the gray portion in FIG. 9). Wherein, FIG. 9 exemplarily illustrates the obtained shape distribution of the whole candidate region.

Returning to FIG. 8, in step S3213, the determination unit 220 determines a sum of the number of candidate regions which can be present at each position in the obtained shape distribution of the candidate regions as the number of the candidate regions. For example, the number of the candidate regions can be determined as "231" according to the shape distribution as shown in FIG. 9. Further, the candidate regions at each position in the shape distribution of the candidate regions may have different shapes and different scales. As stated above, the suitable candidate region can be selected from the storage device 240 according to the shape and scale of the object in the image. For example, for the shape distribution of the candidate regions shown in FIG. 9, assuming that the candidate regions are composed of the quadrangle having different scales and the ellipse having different scales, and thus the candidate regions shown for example in FIG. 10A can be selected for the position which can have three candidate regions, the candidate regions shown for example in FIG. 10B can be selected for the position which can have six candidate regions, and the candidate regions shown for example in FIG. 10C can be selected for the position which can have nine candidate regions.

Returning to FIG. 3, for the determining step S320, the number (i.e., the total number) of the candidate regions determined according to FIGS. 4 and 8 is unfixed. That is to say, the total number of the candidate regions determined by the present disclosure may be different for different scenes. In order to enable that the present disclosure can also be used in scenes in which the calculation amount is limited, the total number of the candidate regions can also be set as a fixed value (i.e., a predefined value). That is to say, the total number of the candidate regions is the same for different scenes. Thus, in order to allocate more candidate regions to a portion where the distribution is denser in the feature distribution of the object, in a case where the total number of the candidate regions is fixed, how to obtain more suitable position distribution of the candidate regions or shape distribution of the candidate regions is mainly focused on in the determining step S320. Therefore, in a further implementation, the determination unit 220 determines the number of candidate regions with reference to FIG. 11.

Figure 11:
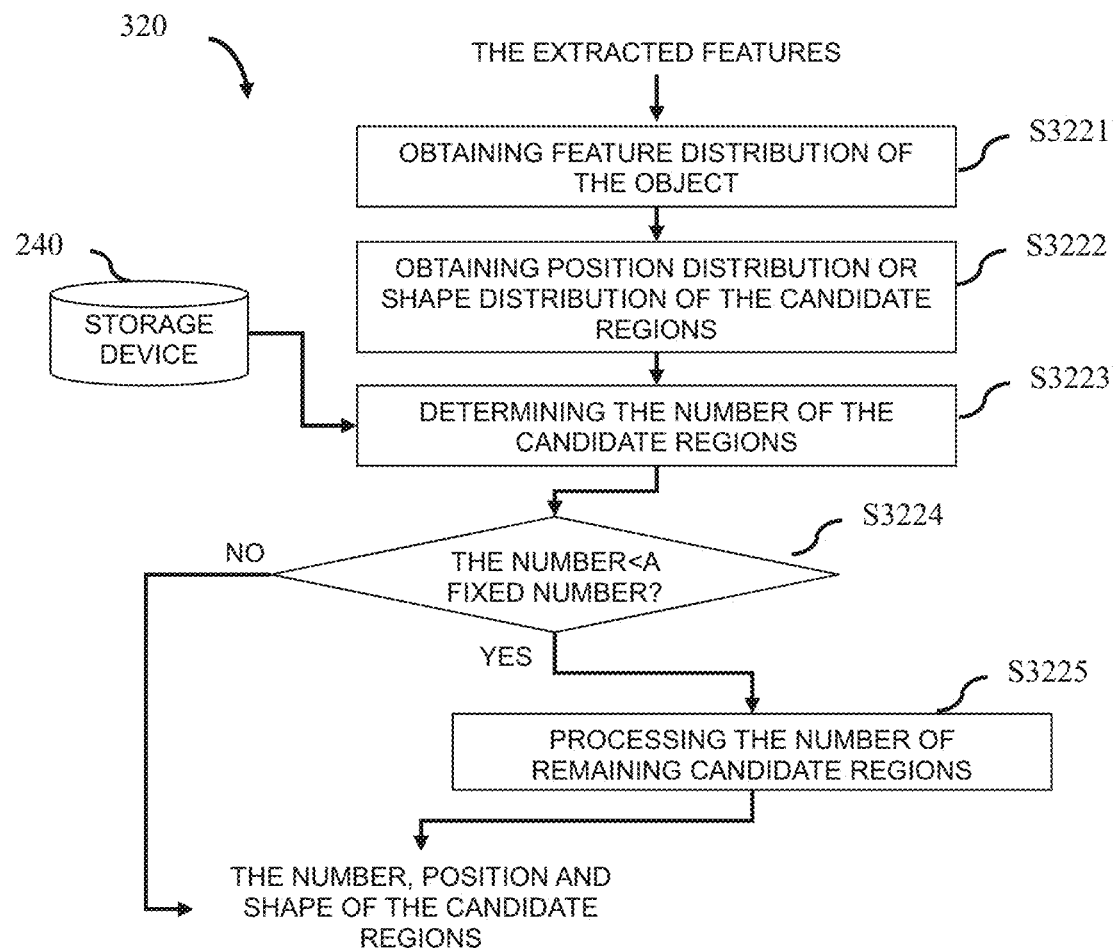
FIG. 11 schematically illustrates further flow chart of a determining step S320 as shown in FIG. 3 according to an embodiment of the present disclosure.

As shown in FIG. 11, since the operation of step S3221 is the same as the operation of step S3201 shown in FIG. 4, no detailed descriptions will be given. Wherein, in a case where the feature distribution of the object is indicated by the normalized values of the feature values of the extracted features, the corresponding normalization operation can be performed for example based on the sum of all feature values, such as one corresponding feature distribution shown in FIG. 12.

In a case where the position distribution of the candidate regions is obtained according to step S3222, the determination unit 220, in step S3222, obtains the position distribution of the candidate regions based on the feature value or normalized value in the obtained feature distribution, the predefined fixed value (i.e., the total number of the usable candidate regions), and the maximum value of the number of positions which are available for allocating the candidate regions and which can be present at the portion corresponding to each feature value or normalized value. For example, the corresponding operation can be implemented by the following exemplary function (7):

$$F_P(s) = \frac{FixNumber * s}{MaxNumber} \quad (7)$$

Wherein, the physical meaning indicated by $F_P(s)$, s and MaxNumber is the same as the physical meaning indicated in the above function (3), and FixNumber indicates the predefined fixed value. Wherein, the above function (7) indicates that: the number of positions which are available for allocating the candidate regions and which can be present at the corresponding portion in the feature distribution can be determined by a ratio of a product of multiplying one feature value or normalized value with the predefined FixNumber to the predefined MaxNumber, wherein the number of the positions can be obtained by for example rounding off or directly rounding the obtained numerical values. Apparently, the present disclosure is not limited to this, and the position distribution can also be obtained by other math algorithms. For example, taking the feature distribution shown in FIG. 12 as an example, s indicates the normalized value, and assuming that the above function (7) is exemplarily set as the following function (8), wherein it is assumed that the value is acquired by the operation of directly rounding:

$$F_P(s) = \frac{792 * s}{9} \quad (8)$$

Figures 12, 13A, 13B:
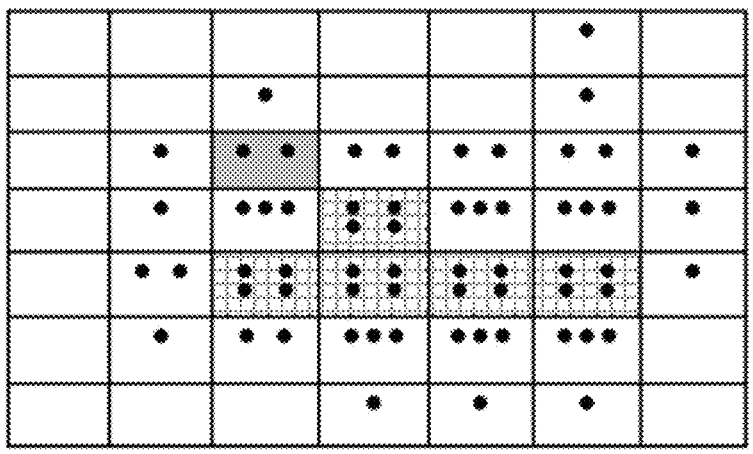
FIG. 12 illustrates another example of the feature distribution indicated by normalized values of the feature values as shown in FIG. 5A.
FIGS. 13A-13B schematically illustrate examples of the position distribution and the shape distribution of the candidate regions determined using the feature distribution as shown in FIG. 12 according to the present disclosure, respectively.

Therefore, for example, for the normalized value "0.03" in the feature distribution for example (as shown by the gray portion in FIG. 12), there may be 2 positions that can be allocated with the candidate regions in the corresponding portion (as shown by the gray portion in FIG. 13A). Wherein, FIG. 13A exemplarily illustrates the position distribution of the whole candidate region obtained according to step S3222, in which one dark spot as shown in FIG. 13A indicates one position at which the candidate regions can be allocated, and there are 62 positions that can be used to allocate the candidate regions in total.

In a case where the shape distribution of the candidate regions is obtained according to step S3222, the determination unit 220, in step S3222, obtains the shape distribution of the candidate regions based on the feature value or normalized value in the obtained feature distribution and the predefined fixed value. For example, the corresponding operation can be implemented by the following exemplary function (9):

$$F_s(s) = FixNumber \#0s \quad (9)$$

Wherein, the above function (9) indicates that: the number of candidate regions which can be present at the corresponding position in the feature distribution can be determined by multiplying one feature value or normalized value with the predefined FixNumber, wherein the number can be obtained by for example rounding off or directly rounding the obtained product values. Apparently, the present disclosure is not limited to this, and the position distribution can also be obtained by other math algorithms. Likewise, taking the feature distribution shown in FIG. 12 as an example, s indicates the normalized value, and assuming that the above function (9) is exemplarily set as the following function (10), wherein it is assumed that the value is acquired by the operation of directly rounding:

$$F_s(s) = 792 * s \quad (10)$$

Therefore, for the normalized value "0.03" in the feature distribution for example (as shown by the gray portion in FIG. 12), there may be 23 candidate regions at the corresponding position (as shown by the gray portion in FIG. 13B). Wherein, FIG. 13B exemplarily illustrates the shape distribution of the whole candidate region obtained according to step S3222.

Returning to FIG. 11, in a case where the position distribution of the candidate regions is obtained according to step S3222, the operation of step S3223 is the same as the operation of step S3203 shown in FIG. 4, and thus no detailed descriptions will be given. Wherein, for example, for the position distribution shown in FIG. 13A, there are "62*9=558" candidate regions that are allocated in total. In a case where the shape distribution of the candidate regions is obtained according to step S3222, the operation of step S3223 is the same as the operation of step S3213 shown in FIG. 8, and thus no detailed descriptions will be given. Wherein, for example, for the shape distribution shown in FIG. 13B, there are "765" candidate regions that are allocated in total.

In step S3224, the determination unit 220 judges whether the number of the candidate regions determined via step S3223 is smaller than the predefined fixed value (e.g. the above "792"). If yes, the number of the remaining candidate regions is further processed in step S3225, otherwise the number of the candidate regions determined via step S3223 is directly output. Wherein, the further processing for the number of the remaining candidate regions includes for example several kinds of operations as follows:

1) no any processing, i.e., directly giving up, while the number of the candidate regions determined via step S3223 is directly output; or 2) in order to allocate more candidate regions to a portion where the distribution is denser in the feature distribution of the object, the number of remaining candidate regions can be superimposed at the position where the position distribution or the shape distribution is densest. For example, for the position distribution shown in FIG. 13A, the remaining "234" candidate regions can also be distributed at 26 positions, such that the 26 positions for example can be allocated to the portion composed of small grids as shown in FIG. 13A. For example, for the shape distribution shown in FIG. 13B, the remaining "27" candidate regions for example can be allocated to the portion composed of small grids as shown in FIG. 13B; or 3) the number of the remaining candidate regions is deemed as the above FixNumber, and steps S3222 to S3224 are executed again to reallocate the number of the remaining candidate regions, until the final number of the candidate regions determined via step S3223 is equal or closest to the predefined fixed value.

Returning to FIG. 3, in the detecting step S330, the detection unit 230 detects the object from the received image based on at least the features extracted in the extracting step S310 and the number, position and shape of the candidate regions determined in the determining step S320. In one implementation, in order to accurately detect the object (e.g. obtain the accurate position of the region where the object is located or the like) for the subsequent human attribute recognition for example, the detection unit 230 detects the object from the received image by executing the regression operation based on the extracted features and the determined number, position and shape of the candidate regions, wherein the determined number of the candidate regions is for example used for determining the number of objects which can be finally output. For example, the detection unit 230 detects the object with reference to FIG. 14.

As shown in FIG. 14, in step S3301, the detection unit 230 determines the initial region position where the object in the image is located and the category confidence to which the object belongs based on the extracted features and the determined position of the candidate regions. Specifically, one initial region position and the corresponding category confidence can be determined at each position of the candidate regions.

In step S3302, for one initial region position determined at each position of the candidate regions, the detection unit 230 updates the initial region position based on the shape of the candidate regions present at the position, so as to obtain the final region position where the object is located. Wherein, the update operation is implemented by for example the scale transformation operation. For example, it is assumed that the candidate regions having nine shapes are allocated at each position of the candidate regions, one initial region position determined at the position will use the nine shapes to perform scale transformation respectively, thereby obtaining nine final region positions.

In step S3303, the detection unit 230 determines the finally output object detection result based on the final region position where the determined object is located and the category confidence to which the object belongs, e.g. output the region position where the object is located, the category confidence of the object and so on. In one implementation, the detection unit 230 can directly output all the object detection results. In another implementation, the detection unit 230 can compare the category confidence of the object with one predefined threshold value (e.g. TH6), and merely output the object detection result in which the category confidence is greater than or equal to TH6. In further implementation, in order to enable that the portion where distribution of the objects is denser in the image can output more object detection results to improve the recall rate of the object detection, the detection unit 230 can determine the finally output object detection result by the following operations:

Firstly, the detection unit 230 determines density distribution of the object in the image based on the extracted features. Wherein, the density distribution can be obtained by for example classification prediction or comparing the feature value of the extracted features with one predefined threshold value (e.g. TH7). It is assumed that the feature distribution obtained according to the extracted features is shown for example in FIG. 15A, wherein the feature distribution is directly indicated by the feature value. After each feature value in FIG. 15A is compared with TH7 (assuming it is 0.5), it is assumed to obtain that distribution of the objects is dense and there are 13 objects in the gray portion in FIG. 15A, and distribution of the objects is sparse and there is for example no object in other portions in FIG. 15A, such that the determined density distribution is shown for example in FIG. 15B.

Secondly, the detection unit 230 sets different predefined threshold values for the portions in the image, which are respectively corresponding to different density distribution values in the density distribution based on the determined density distribution, so as to obtain the threshold value distribution. Wherein, the density distribution value (e.g. the numerical value "13" in FIG. 15B) in the density distribution is larger, and the corresponding portion in the image is provided with smaller predefined threshold values. For example, based on the density distribution shown in FIG. 15B, the threshold value distribution obtained with reference to the feature distribution shown in FIG. 15A is as shown in FIG. 15C. For example, as shown in FIG. 15C, the density distribution value in the gray portion therein is large such that a smaller predefined threshold value (e.g. 0.4) is set, and a larger predefined threshold value (e.g. 0.8) is set for other portions. However, apparently, the present disclosure is not limited to this, and suitable threshold value distribution can be obtained according to the practical scene.

Then, the detection unit 230 determines the finally output object detection result based on the obtained threshold value distribution and the object detection result obtained via step S3302. For example, for one object detection result, the category confidence in the detection result is compared with the corresponding threshold value (e.g. at the same position) in the threshold value distribution, and the object detection result is output only when the category confidence is greater than or equal to the corresponding threshold value.

Returning to FIG. 3, for the detecting step S330, the accurate object detection result (e.g. the accurate region position where the object is located) can be obtained according to the regression operation shown in FIG. 14. However, for some subsequent processing (e.g. abnormal detection) or the crowded scene, it is usually enough to merely obtain the rough region position of the object. Therefore, in another implementation, the detection unit 230 performs different detection processing for the objects therein based on the density distribution of the objects in the image, and the main processing is as follows:

Firstly, the detection unit 230 divides the image into a portion from which the object is needed to be accurately detected and a portion from which the object is not needed to be accurately detected based on the density distribution of the object in the image. On one hand, the detection unit 230 determines the density distribution of object in the image.

Wherein, determination about the density distribution of the object is the same as the corresponding description of step S3303 in FIG. 14, and thus no detailed descriptions will be given. Wherein, it is assumed that the determined density distribution of the object is shown for example in FIG. 16. On the other hand, the detection unit 230 divides the image by comparing the density distribution value in the determined density distribution with one predefined threshold value (e.g. TH8). For example, a portion corresponding to the portion in which the density distribution value is larger than TH8 in the image is determined as a portion from which the object is not needed to be accurately detected, and a portion corresponding to the portion in which the density distribution value is smaller than or equal to TH8 in the image is determined as a portion from which the object is needed to be accurately detected. Taking the density distribution shown in FIG. 16 as an example, assuming that TH8 is set to be equal to 5, a portion corresponding to the portion in which the density distribution value is "3" in the image is determined as a portion from which the object is needed to be accurately detected, and other portions in the image (i.e., portions corresponding to the portions in which the density distribution values is "6 and 9" in the image) are determined as portions from which the object is not needed to be accurately detected.

Secondly, for the portion from which the object is not needed to be accurately detected, the detection unit 230 for example directly outputs the position and shape of the candidate regions determined at the position corresponding to the above portion. For the portion from which the object is needed to be accurately detected, the detection unit 230 executes the flow as shown in FIG. 14 for the above portion to detect the corresponding object.

Finally, returning to FIG. 3, the detection unit 230 transfers the detection result (e.g. the detected object) to the output device 160 via the system bus 180 shown in FIG. 1, so as to display the detected object to the user or output the detection result to the subsequent image processing such as human image retrieval, human attribute recognition, human action recognition, human identification verification and so on.

Further, as stated in FIG. 2, in order to improve accuracy of the object detection, all of the extraction unit 210, the determination unit 220 and the detection unit 230 execute the corresponding operation using the pre-generated neural network stored for example in the storage device 240. In other words, for the extracting step S310, the determining step S320 and the detecting step S330 shown in FIG. 3, the corresponding operation can also be executed using the pre-generated neural network. Further, on one hand, for the objects having different scales in the image, features with different levels usually can be extracted from the image respectively using the neural network. On the other hand, features with different levels usually have different semantic meaning, such that the feature distribution obtained based on features with different levels are different, and further the number of the candidate regions determined for features with different levels are also different. Thus, in a case where the present disclosure executes the corresponding operation by using the pre-generated neural network, for each feature among features with different levels extracted by the extraction unit 210, the determination unit 220 and the detection unit 230 can detect corresponding objects therefrom with reference to the flow shown in FIG. 3. Wherein, in the determining step S320 shown in FIG. 3, in order to balance improvement of the object detection accuracy and improvement of the object detection speed, the determination unit 220 determines the number of candidate regions by respectively selecting different schemes from the schemes stated from FIG. 4 to FIG. 13B for features with different levels. Wherein, for the feature with a high level (i.e., an object with a large scale), for example the scheme that the number of candidate regions are determined by determining the shape distribution of the candidate regions, as stated in FIG. 8, can be selected to use. Wherein, for the feature with a low level (i.e., an object with a small scale), for example the scheme that the number of candidate regions are determined by determining the position distribution of the candidate regions, as stated in FIG. 4, can be selected to use. Wherein, for the feature with an intermediate level (i.e., an object with an intermediate scale), the number of candidate regions can be determined by for example selecting to use any one of the schemes. However, apparently, the present disclosure is not limited to this. Further, for features with different levels, the determination unit 220 can also use the same scheme to determine the number of candidate regions.

As stated above, no matter whether the total number of candidate regions available for the object detection is set as one fixed value, namely, no matter whether the calculation amount of the object detection is limited, the corresponding number of candidate regions can be dynamically allocated at each corresponding position in the image according to the present disclosure. Therefore, on one hand, more candidate regions are allocated to the portion where the distribution is denser in the feature distribution (i.e., the portion where distribution of the objects is denser in the image), such that the detection accuracy of the object detection can be improved. On the other hand, fewer candidate regions are allocated to the portion where distribution of the objects is sparser in the image (i.e., a portion that has a larger probability to belong to the background), such that the detection speed of the object detection can be improved.

For example, taking a man walking on a crutch (as shown in FIG. 17A) as an example, the region of the object detected according to the embodiment of the present disclosure is shown by for example the rectangle frame in FIG. 17B, wherein the solid line frame is for example a region where the man is located, and the dotted line frame is for example a region where the crutch is located.

(Generation of a Neural Network)

Figure 18:
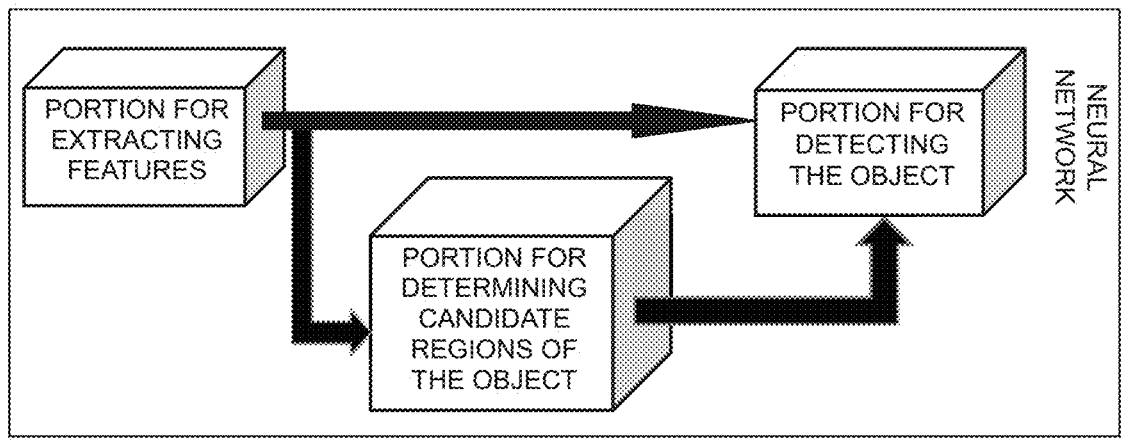
FIG. 18 schematically illustrates a schematic structure of a pre-generated neural network used in an embodiment of the present disclosure.

As stated above, the corresponding operation can be executed using the pre-generated neural network in the embodiment of the present disclosure. As shown in FIG. 18 for example, the pre-generated neural network available in the embodiment of the present disclosure can include for example a portion for extracting the features, a portion for determining candidate regions of the object and a portion for detecting the object. In the present disclosure, the corresponding neural network can be pre-generated using a deep learning method (e.g. a neural network method) based on the training samples in which the region position of the object, the category of the object, the candidate region of the object, etc., are labeled.

Figure 19:
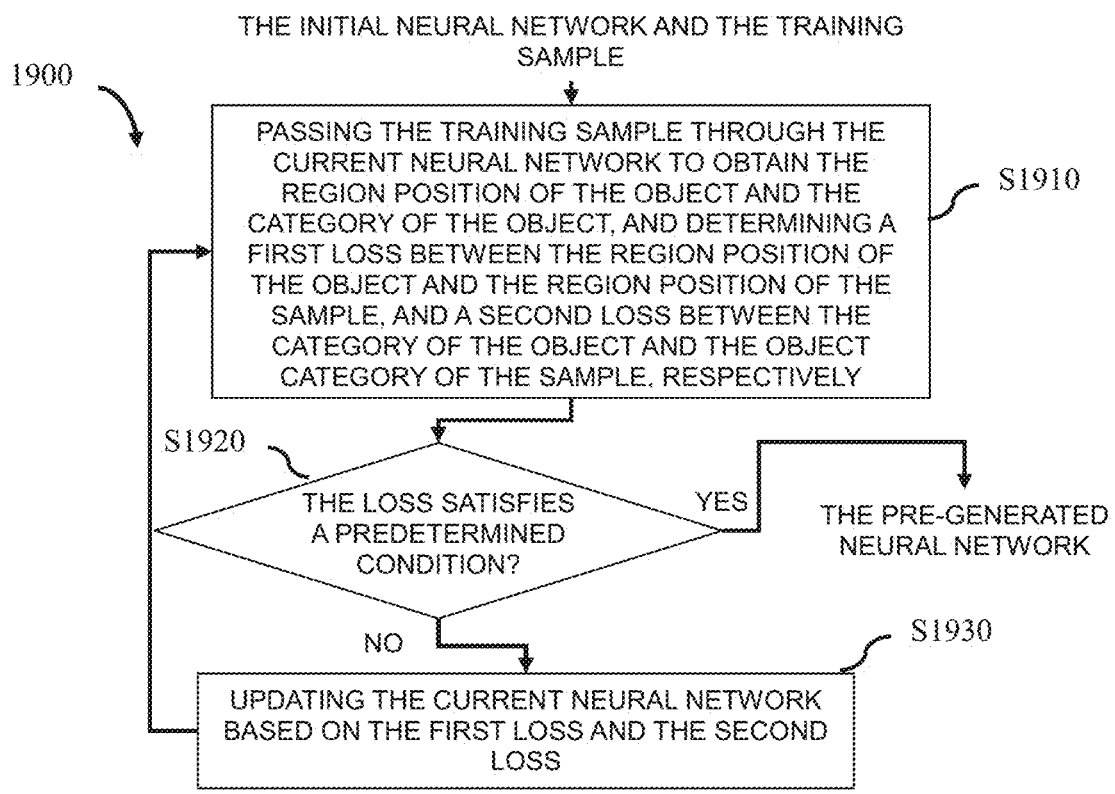
FIG. 19 schematically illustrates a flow chart of a generating method for pre-generating a neural network used in an embodiment of the present disclosure.

In one implementation, in order to reduce the time required to generate the neural network, the portion for extracting the features, the portion for determining candidate regions of the object and the portion for detecting the object in the neural network are updated jointly by means of backward propagation. FIG. 19 schematically illustrates a flow chart 1900 of a generation method of pre-generating a neural network available in an embodiment of the present disclosure. In the flow chart 1900 show in FIG. 19, it is illustrated by taking generation of a corresponding neural network using a neural network method as an example.

However, apparently, the present disclosure is not limited to this. Wherein, the generation method with reference to FIG. 19 can also be executed by the hardware configuration 100 shown in FIG. 1.

As shown in FIG. 19, at first, the CPU 110 as shown in FIG. 1 acquires the initial neutral network that has been preset and a plurality of pieces of training samples via the input device 150. Wherein, each training sample is labeled with the region position of the object and the category of the object.

Then, in step S1910, on one hand, the CPU 110 passes the training sample through the current neural network (e.g. initial neural network) to obtain the region position of the object and the category of the object. That is to say, the CPU 110 passes the training sample through the portion for extracting the features, the portion for determining candidate regions of the object and the portion for detecting the object in the current neural network in turn, so as to obtain the region position of the object and the category of the object. On the other hand, for the obtained region position of the object, the CPU 110 determines a loss (e.g. a first loss, i.e., Loss1) between the obtained region position of the object and the region position of the sample. Wherein, the region position of the sample can be obtained according to the region position of the object labeled in the training sample. Wherein, the first loss (Loss1) indicates an error between the predicted region position obtained using the current neural network and the region position of the sample (i.e., real region position), wherein the error is measured by for example a distance. For example, the first loss (Loss1) can be obtained by the following formulas (11) and (12):

$$\text{Loss1} = \sum_{i \in \{x,y,w,h\}} \text{smooth}_{L1}(t_i^n - v_i^n) \quad (11)$$

$$\text{Smooth}_{L1}(x) = \begin{cases} 0.5x^2 & |x| \langle 1 \\ |x| - 0.5 & \text{other} \end{cases} \quad (12)$$

Wherein, $\text{Smooth}_{L1}(x)$ indicates a difference between the region position of the object and the real region position, x indicates a horizontal coordinate at the top left corn of the region position of the object, y indicates a vertical coordinate at the top left corn of the region position of the object, w indicates a width of the region where the object is located, h indicates a height of the region where the object is located, $t_i^n$ indicates the region position of the object whose object category is n, and $v_i$ indicates the real region position of the object whose object category is n.

For the obtained category of the object, the CPU 110 determines a loss (e.g. a second loss, i.e., Loss2) between the obtained category of the object and the object category of the sample. Wherein, the object category of the sample can be obtained according to the category of the object labeled in the training sample. Wherein, the second loss (Loss2) indicates an error between the predicted object category obtained using the current neural network and the object category of the sample (i.e., real object category), wherein the error is measured by for example a distance. For example, the second loss (Loss2) can be obtained by the following formula (13):

$$\text{Loss2} = -\sum_{m=1}^{M} y_m \log p_m \quad (13)$$

Wherein, m indicates a number of the object category to which the object in the training sample may belong, and M indicate the maximum number of the object category, the object category indicates an object category to which the object in the training sample belongs; $y_m$ indicates the real object category of the object on the object category m; and $p_m$ indicates the predicted object category of the object on the object category m.

Returning to FIG. 19, in step S1920, the CPU 110 judges whether the current neural network satisfies the predetermined condition based on all the losses (i.e., the first loss (Loss1) and the second loss (Loss2)) that are determined to have been obtained. For example, the sum/weighted sum of the two losses is compared with one threshold value (e.g. TH9), and in a case where the sum/weighted sum of the two losses is smaller than or equal to TH9, the current neural network is judged to satisfy the predetermined condition and is output as the final neural network (i.e., as the pre-generated neural network), wherein the final neural network is for example output to the storage device 240 shown in FIG. 2 for the object detection as stated in FIGS. 2 to 16. In a case where the sum/weighted sum of the two losses is larger than TH9, the current neural network is judged to not satisfy the predetermined condition yet, and the generation process proceeds to step S1930.

In step S1930, the CPU 110 updates the current neural network based on the first loss (Loss1) and the second loss (Loss2), namely, updates parameters of each layer in the portion for detecting the object, the portion for determining candidate regions of the object and the portion for extracting the features in the current neural network in turn. Wherein, the parameters of each layer herein are for example weighted values in each convolution layer in each portion as mentioned above. In one example, the parameters of each layer are updated using for example the stochastic-gradient-descent method based on the first loss (Loss1) and the second loss (Loss2). After that, the generation process re-proceeds to step S1910.

In the flow 1900 shown in FIG. 19, whether the sum/weighted sum of the two losses, i.e., the first loss (Loss1) and the second loss (Loss2), satisfies the predetermined condition is used as a condition to stop updating the current neural network. However, apparently, the present disclosure is not limited to this. Alternatively, step S1920 can be omitted for example, and the corresponding update operation is stopped after the number of times of updating the current neural network reaches a predetermined number of times.

(Application)

Figure 20:
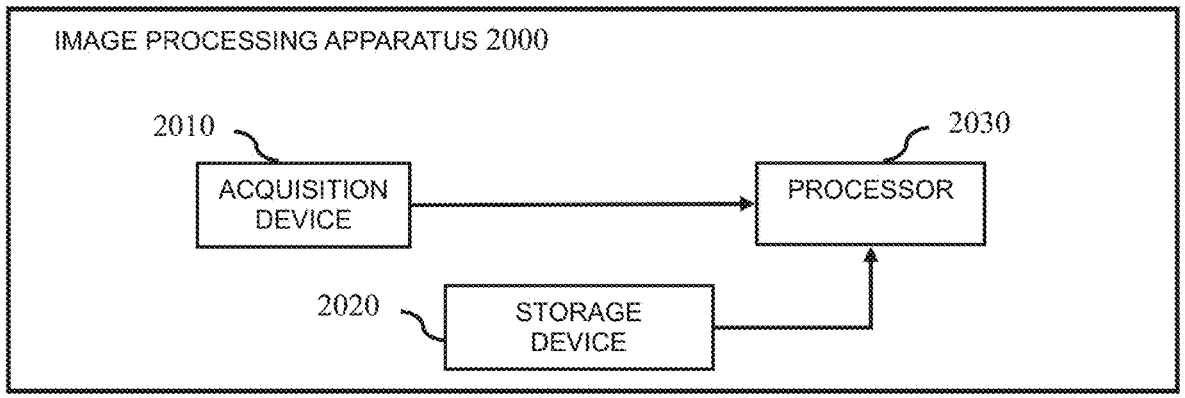
FIG. 20 illustrates an arrangement of an exemplary application apparatus according to the present disclosure.

Further, as stated above, the present disclosure can be implemented by a monitor device (e.g. a network camera). Accordingly, as one application, taking that the present disclosure is implemented by a network camera as an example, FIG. 20 illustrates an arrangement of an exemplary image processing apparatus 2000 according to the present disclosure. As shown in FIG. 20, the image processing apparatus 2000 at least includes an acquisition device 2010, a storage device 2020 and a processor 2030. Apparently, the image processing apparatus 2000 can further include an input device, an output device and so on (not shown).

As shown in FIG. 20, at first, the acquisition device 2010 (e.g. an optical system of the network camera) captures images or videos at the position of interest and transfers the captured images or videos to the processor 2030. Wherein, the above position of interest can be for example a subway entrance/exit needing to monitor whether a person requiring to be taken care of appears.

The storage device 2020 stores instructions, wherein the stored instructions at least are instructions corresponding to the object detection method as stated in FIGS. 3 to 16.

The processor 2030 executes the stored instructions based on the captured images or videos, such that the processor can at least implement the object detection method as stated in FIGS. 3 to 16, thereby detecting the objects in the captured images or videos.

Further, in a case where the storage device 2020 further stores subsequent image processing instructions, e.g. judges whether a person requiring to be taken care of or the like appears at the position of interest, the processor 2030 can also execute the corresponding subsequent image processing instructions based on the detected object, so as to implement the corresponding operation. In such case, an external display apparatus (not shown) can be connected to the image processing apparatus 2000 via for example a network, such that the external display apparatus can output subsequent image processing results (e.g. a person requiring to be taken care of appearing, information relevant to the person requiring to be taken care of or the like) to the user. Alternatively, the above subsequent image processing instructions can also be executed via an external processor (not shown). In such case, the above subsequent image processing instructions are stored for example in the external storage device (not shown), and the image processing apparatus 2000, the external storage device, the external processor and the external display apparatus can be connected via for example the network. Therefore, the external processor can execute the subsequent image processing instructions stored in the external storage device based on the object detected by the image processing apparatus 2000, and the external display apparatus can output subsequent image processing results to the user.

Figure 21:
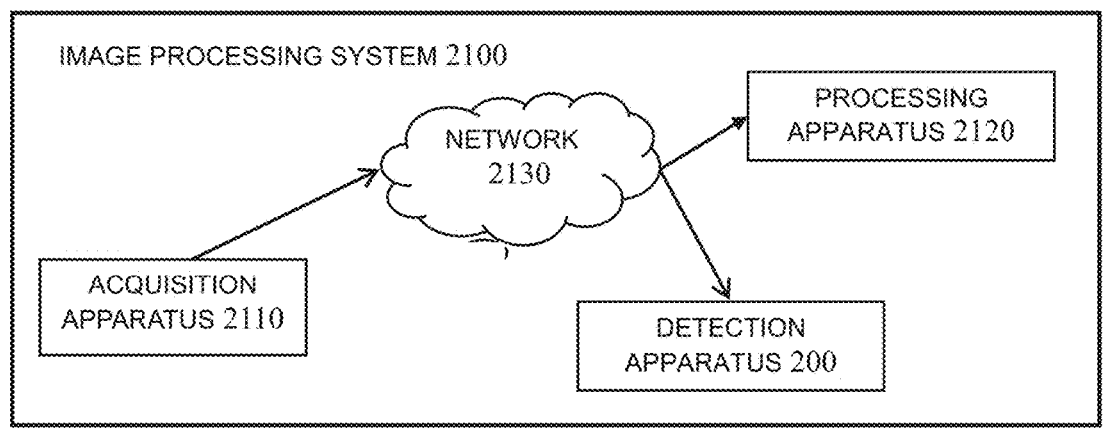
FIG. 21 illustrates an arrangement of an exemplary application system according to the present disclosure.

Further, as stated above, the present disclosure can also be implemented by the computer (e.g. a client server). Thus, as one application, taking that the present disclosure is implemented by the client server as an example, FIG. 21 illustrates an arrangement of an exemplary image processing system 2100 according to the present disclosure. As shown in FIG. 21, the image processing system 2100 includes an acquisition apparatus 2110 (e.g. at least one network camera), a processing apparatus 2120 and the detection apparatus 200 as shown in FIG. 2, wherein the acquisition apparatus 2110, the processing apparatus 2120 and the detection apparatus 200 are connected each other via a network 2130. Wherein, the processing apparatus 2120 and the detection apparatus 200 can be implemented by the same client server, and can also be implemented respectively by different client servers.

As shown in FIG. 21, at first, the acquisition apparatus 2110 captures images or videos at the position of interest and transfers the captured images or videos to the detection apparatus 200 via the network 2130. Wherein the above position of interest can be for example a subway entrance/exit needing to monitor whether a person requiring to be taken care of appears.

The detection apparatus 200 detects the object from the captured images or videos with reference to FIGS. 2 to 16.

The processing apparatus 2120 executes the subsequent image processing operation based on the detected object, e.g. judges whether a person requiring to be taken care of appears at the position of interest or the like. Further, the display apparatus or the alarming apparatus can also be connected via the network 2130, so as to output corresponding image processing results (e.g. a person requiring to be taken care of appearing, information relevant to the person requiring to be taken care of or the like) to the user.

All the above units are illustrative and/or preferable modules for implementing the processing in the present disclosure. These units may be hardware units (such as Field Programmable Gate Array (FPGA), Digital Signal Processor, Application Specific Integrated Circuit and so on) and/or software modules (such as computer readable program). Units for implementing each step are not described exhaustively above. However, in a case where a step for executing a specific procedure exists, a corresponding functional module or unit for implementing the same procedure may exist (implemented by hardware and/or software). The technical solutions of all combinations by the described steps and the units corresponding to these steps are included in the contents disclosed by the present application, as long as the technical solutions constituted by them are complete and applicable.

The methods and apparatuses of the present disclosure can be implemented in various forms. For example, the methods and apparatuses of the present disclosure may be implemented by software, hardware, firmware or any other combinations thereof. The above order of the steps of the present method is only illustrative, and the steps of the method of the present disclosure are not limited to such order described above, unless it is stated otherwise. In addition, in some embodiments, the present disclosure may also be implemented as programs recorded in recording medium, which include a machine readable instruction for implementing the method according to the present disclosure. Therefore, the present disclosure also covers the recording medium storing programs for implementing the method according to the present disclosure.

While some specific embodiments of the present disclosure have been demonstrated in detail by examples, it is to be understood for persons skilled in the art that the above examples are only illustrative and does not limit to the scope of the present disclosure. In addition, it is to be understood for persons skilled in the art that the above embodiments can be modified without departing from the scope and spirit of the present disclosure. The scope of the present disclosure is restricted by the attached Claims.

What is claimed is:

1. A detection apparatus comprising:
   one or more processors, and
   one or more memories storing executable instructions which, when executed by the one or more processors, cause the detection apparatus to perform operations including:
   extracting feature distribution from an image;
   determining anchors of an object in the image based on the feature distribution, wherein the anchors which have different shapes or different scales are allocated to each of positions in the image so that a number of the anchors corresponding to a position in the image is N anchors in a case that a feature corresponding to the position in the image is equal or greater than a first threshold value, and is M anchors wherein M anchors is less than N anchors in a case that the feature corresponding to the position in the image is smaller than the first threshold value and is equal or greater than a second threshold value, and is L anchors is greater than 0 and less than M anchors in a case that the feature corresponding to the position in the image is smaller than the second threshold value; and
   detecting a position of the object in the image based on at least the feature distribution and the anchors.

2. The detection apparatus according to claim 1, wherein the anchors are rectangular anchors, circular anchors and elliptical anchors.

3. The detection apparatus according to claim 2, wherein the anchors are a plurality of different-scale rectangular anchors, a plurality of different-scale circular anchors and a plurality of different-scale elliptical anchors.

4. The detection apparatus according to claim 3, wherein N=9 anchors are allocated to the position corresponding to the feature equal or greater than the first threshold value, M=6 anchors are allocated to the position corresponding to the feature smaller than the first threshold value and equal to or greater than the second threshold value, and 3 anchors are allocated to the position corresponding to the feature smaller than the second threshold value.

5. The detection apparatus according to claim 4, wherein 6-different-scale rectangular anchors and 3-different-scale circular anchors are allocated to the position corresponding to the feature equal to or greater than the first threshold value as the anchors, the position corresponding to the feature smaller than the first threshold value and equal to or greater than the second threshold value as the anchors, and 2-different-scale rectangular anchors and one circular anchor are allocated to the position corresponding to the feature smaller than the second threshold value as the anchors.

6. The detection apparatus according to claim 1, wherein the feature corresponding to the position in the image indicates feature values extracted by a feature extracting algorithm or normalized values by normalizing feature values of the features contained in the feature distribution.

7. The detection apparatus according to claim 1, wherein a total number of the anchors allocated to the image is equal to or smaller than a predefined value, and the number of the anchors corresponding to the image is determined further based on the predefined value.

8. The detection apparatus according to claim 1, wherein for objects having different scales in the image, the feature distributions are extracted with different levels respectively from the image.

9. The detection apparatus according to claim 1, wherein the position of the object in the image is extracted by executing a regression operation based on the feature distribution and the determined number, position and shape of the anchors.

10. The detection apparatus according to claim 1, wherein the position of the object is detected in a case that a category confidence corresponding to the anchor is greater than or equal to a third threshold value, and the third threshold value is determined based on the feature distribution.

11. The detection apparatus according to claim 1, wherein the position of the object is output by updating based on a shape of the anchor corresponding to a first portion in a case that a feature corresponding to the first portion is smaller than a fourth threshold value, and the position of the object is output as a position as the anchor corresponding to a second portion in a case that a feature corresponding to the second portion is greater than or equal to the fourth threshold value.

12. The detection apparatus according to claim 1, wherein the feature distribution is obtained by using a pre-generated neural network.

13. A detecting method comprising:
extracting feature distribution from an image;
determining anchors of an object in the image based on the feature distribution, wherein the anchors which have different shapes or different scales are allocated to each of positions in the image so that a number of the anchors corresponding to a position in the image is N anchors in a case that a feature corresponding to the position in the image is equal or greater than a first threshold value, and is M anchors wherein M anchors is less than N anchors in a case that the feature corresponding to the position in the image is smaller than the first threshold value and is equal or greater than a second threshold value, and is L anchors wherein L anchors is greater than 0 and less than M anchors in a case that the feature corresponding to the position in the image is smaller than the second threshold value; and
detecting a position of the object in the image based on at least the feature distribution and the anchors.

14. The detecting method according to claim 13, wherein the anchors are rectangular anchors, circular anchors and elliptical anchors.

15. The detecting method according to claim 14, wherein the anchors are a plurality of different-scale rectangular anchors, a plurality of different-scale circular anchors and a plurality of different-scale elliptical anchors.

16. The detecting method according to claim 13, wherein a total number of the anchors allocated to the image is equal to or smaller than a predefined value, and the number of the anchors corresponding to the image is determined further based on the predefined value.

17. The detecting method according to claim 13, wherein the position of the object is extracted from the image by executing a regression operation based on the feature distribution and the determined number, position and shape of the anchors.

18. The detecting method according to claim 13, wherein the feature distribution is obtained by using a pre-generated neural network.

19. A non-transitory computer-readable storage medium storing instructions that, when executed by a computer, cause the computer to perform the detecting method according to claim 13.

20. An image processing apparatus comprising:
an acquisition device which acquires an image or video;
a storage device which stores an instruction; and
a processor which executes the instruction based on the acquired image or video, such that the processor at least implements the following steps:
extract feature distribution from the image;
determine anchors of an object in the image based on the feature distribution, wherein the anchors which have different shapes or different scales are allocated to each of positions in the image so that a number of the anchors corresponding to a position in the image is N anchors in a case that a feature corresponding to the position in the image is equal or greater than a first threshold value, and is M anchors wherein M anchors is less than N anchors in a case that the feature corresponding to the position in the image is smaller than the first threshold value and is equal or greater than a second threshold value, and is L anchors wherein L anchors is greater than 0 and less than M anchors in a case that the feature corresponding to the position in the image is smaller than the second threshold value; and
detect a position of the object from in the image based on at least the feature distribution and the anchors.

21. An image processing system comprising:
an acquisition apparatus which acquires an image or video;

a detection apparatus for detecting an object from the acquired image or video by extracting feature distribution from the image, determine anchors of an object in the image based on the feature distribution, wherein the anchors which have different shapes or different scales are allocated to each of positions in the image so that a number of the anchors corresponding to a position in the image is N anchors in a case that a feature corresponding to the position in the image is equal or greater than a first threshold value, and is M anchors wherein M anchors is less than N anchors in a case that the feature corresponding to the position in the image is smaller than the first threshold value and is equal or greater than a second threshold value, and is L anchors wherein L anchors is greater than 0 and less than M anchors in a case that the feature corresponding to the position in the image is smaller than the second threshold value; and detecting a position of the object in the image based on at least the feature distribution and the anchors; and a processing apparatus which executes a subsequent image processing operation based on the detected object, wherein the acquisition apparatus, the detection apparatus and the processing apparatus are connected to each other via a network.

\* \* \* \* \*